May 12, 1964  C. W. DAVIS ETAL  3,133,039
ACRYLONITRILE POLYMER COMPOSITIONS
Filed Nov. 25, 1957
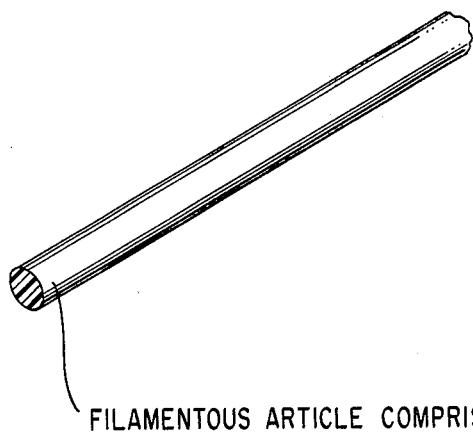
FILAMENTOUS ARTICLE COMPRISED OF AN ACRYLONITRILE POLYMER HAVING A COPOLYMER OF AN ALKYLENEBISACRYLAMIDE AND AN ORGANIC SULFONIC ACID COMPOUND INCORPORATED THEREIN.
*INVENTORS.*
CLYDE W. DAVIS
FORREST A. EHLERS
BY
*Griswold & Burdick*
*ATTORNEYS*

3,133,039
ACRYLONITRILE POLYMER COMPOSITIONS
Clyde W. Davis, Williamsburg, Va., and Forrest A. Ehlers, Walnut Creek, Calif., assignors to The Dow Chemical Company, Midland, Mich., a corporation of Delaware
Filed Nov. 25, 1957, Ser. No. 698,768
12 Claims. (Cl. 260—45.5)

The present invention resides in the general field of organic chemistry and contributes specifically to the polymer art, especially with respect to fiber-forming polymers. The invention is pertinent to the man-made synthetic textile fiber industry. It is particularly concerned with certain acrylonitrile polymer compositions, advantageously of the fiber-forming variety, and shaped articles which have been fabricated therefrom that have significantly enhanced properties and characteristics as regards improvements in and relating to enhanced dye-receptivity, minimized inherent propensity to accumulate electrostatic charges and an augmented natural stability to various deteriorating influences, including stability against becoming deleteriously influenced and degraded upon exposure to heat at elevated temperatures and light. Within the scope and purview of the invention there is comprehended both the novel and utile polymer compositions of the indicated variety (as well as various shaped articles fabricated therefrom and comprised thereof) and advantageous methods for their preparation.

It is the main purpose and primary design of the present invention to provide and make available acrylonitrile polymer compositions of the above-indicated and hereinafter more fully delineated type and shaped articles therefrom that have, as intrinsic and distinguishing characteristics, excellent receptivity of and acceptability for any of a wide variety of dyestuffs; permanently imbued antistatic properties that are unusually good for and not commonly encountered in polymeric materials of the synthetic, essentially hydrophobic varieties of such substances; and efficacious natural stability to heat and light as well as to certain chemical conditions such as alkaline environments.

The compositions of the present invention which fulfill such ends and offer corollary advantages and benefits, as will hereinafter be manifest, are, in essence, comprised of an intimate and practically inseparable blend or alloy constitution of (1) an acrylonitrile polymer that contains in the polymer molecule at least about 80 percent by weight of acrylonitrile which preferably is of the fiber-forming variety and, most advantageously, is polyacrylonitrile and (2) a minor proportion of a beneficial polymeric additament that functions and serves simultaneously in the treble capacity of a dye-assisting adjuvant, permanent antistatic agent and stabilizer and which is comprised of a copolymer of an alkylenebisacrylamide or an alkylenebismethacrylamide or their alkylidene counterparts and and organic sulfonic acid compound (including free acid compounds and ester or salt derivatives) that contains a substituent, reactive vinyl or other alkenyl group in its molecule. The method of the invention by which such advantageous compositions may be made involves incorporating the minor proportion of the copolymeric additament in and with the acrylonitrile polymer base by any of several beneficial techniques, hereinafter more thoroughly defined, adapted to suitably accomplish the desired result.

Without being limited to or by the specific embodiments and modes of operation set forth, the invention is illustrated in and by the following docent examples wherein, unless otherwise indicated, all parts and percentages are to be taken on a weight basis.

EXAMPLE "A"

In a suitable reaction vessel there was charged and heated together for a ten minute period at 50° C. about 72.5 parts of ethylene sulfonic acid, 72.5 parts of N,N'-methylenebisacrylamide, about 170 parts of water and about 1.0 parts of potassium persulfate. About 145 parts of a completely water-insoluble copolymer product was thereby obtained. The copolymer was found to contain in its molecule about 49.8 percent of the polymerized ethylene sulfonic acid constituent. When a minor proportion of the copolymer product was blended with a polyacrylonitrile, the resulting composition, upon being converted to filamentary shaped article form, was found to have good dye-receptivity, quite satisfactory stability to heat and light and an unusually slight or low tendency to accumulate charges of static electricity.

EXAMPLE "B"

About 10.5 parts of ethylene sulfonic acid, 15.0 parts of N,N'-methylenebisacrylamide, 0.2 part of "Antarox D100" (a nonionic, polyglycol ether type of surfactant that is a condensation product of 1 mole of oleyl alcohol with 20 moles of ethylene oxide), 0.3 part of ammonium persulfate and 450 parts of water were charged to a flask and thoroughly mixed therein. The resulting mixture, having a pH of about 1, was heated at 50° C. for 18 hours with continued agitation to effect polymerization. About 88 percent of the monomeric ingredients were converted to a water insoluble copolymer product that had the form of a soft white gel which was easily dispersable as a finely divided solid in the reaction vehicle or in water.

Polyacrylonitrile fibers containing about 4.1 percent of the above copolymer product were prepared by impregnating filamentary structures that were in aquagel condition after having been salt-spun and wet-stretched in and with an aqueous dispersion of the copolymer that contained about 3.5 percent copolymer solids. The polyacrylonitrile aquagel fiber that was employed had been obtained by extruding a spinning solution of fiber-forming polyacrylonitrile comprised of about 10 parts of the polymer dissolved in 90 parts of a 60 percent aqueous solution of zinc chloride through a spinnerette having 750 individual 6 mil diameter orifices into an aqueous coagulating bath that contained about 42 percent of dissolved zinc chloride to form a multiple filament tow. After being spun, the tow bundle of coagulated polyacrylonitrile aquagel fiber was washed substantially free from salt upon being withdrawn from the coagulating bath and then wet-stretched for orientation to a total stretched length that was about thirteen times its original extruded length. The aquagel fiber was then passed through the mentioned aqueous impregnating bath of the dispersed copolymer additive so as to become impregnated therewith to the indicated extent.

Following the impregnation, the aquagel fiber was irreversibly dried at 150° C. to destroy the water-hydrated structure and convert it to a finished fiber form. It was then heat set for five minutes at 150° C. The finally obtained 3 denier fiber product had a tenacity of about 3.5 grams per denier, an elongation of about 33 percent and a wet yield strength of about 0.98 gram per denier. The copolymer-containing acrylonitrile polymer fiber product was found to have excellent natural stability to heat and light as well as against becoming degraded under the influence of aqueous alkaline media at pH levels as high as 10. It was found to be nearly free of propensity to accumulate charges of static electricity upon handling; being about commensurate with viscose rayon fibers in this regard. As is widely appreciated, viscose rayon is not considered to be afflicted to a troublesome degree with problems due to static.

The fiber product dyed well to deep and level shades of coloration with Calcodur Pink 2BL, a direct type of dyestuff (Colour Index Direct Red 75, formerly Colour Index 353) and Sevron Brilliant Red 4G, a basic dye formerly known as Basic Red 4G (Colour Index Basic Red 14).

The dyeing with Calcodur Pink 2BL was performed at the 4 percent level according to conventional procedure in which the fiber sample was maintained for about one hour at the boil in the dyebath which contained the dyestuff in an amount equal to about 4 percent of the weight of the fiber. The dyebath also contained sodium sulfate in an amount equal to about 15 percent of the weight of the fiber and had a bath-to-fiber weight ratio of about 30:1. After being dyed, the fiber was rinsed in water and dried for about 20 minutes at 80° C. The dye-receptivity of the Calcodur Pink 2BL-dyed fiber was then evaluated spectrophotometrically by measuring the amount of monochromatic light having a wave length of about 520 millimicrons from a standard source that was reflected from the dye sample. A numerical value on an arbitrarily designated scale from zero to one hundred was thereby obtained. This value represented the relative comparison of the amount of light that was reflected from a standard white tile reflector that had a reflectance value of 316 by extrapolation from the 0–100 scale. Lower reflectance values are an indication of better dye-receptivity in the fiber. For example, a reflectance value of about 20 or 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval. The Calcodur Pink 2BL-dyed polyacrylonitrile fibers containing the ethylene sulfonic acid N,N'-methylenebisacrylamide copolymer in accordance with the invention had a reflectance value of about 20. In contrast, ordinary unmodified polyacrylonitrile fibers of the same type generally have a reflectance value of about 130 on the same numerical scale.

Equivalent results were obtained when the foregoing procedure was repeated excepting to impregnate the aquagel fiber with the copolymer additive prior to the stretch-drawing operation on the fiber.

EXAMPLE "C"

About 3 grams (on a dry basis) of salt-spun, wet-stretched polyacrylonitrile aquagel fiber similar to that employed in Example "B" and containing about three parts of water for each part of dry polymer was soaked for about 30 minutes at room temperature in 100 milliliters of an aqueous solution of about 4.0 grams of ethylene sulfonic acid, 4.0 grams of N,N'-methylenebisacrylamide and 0.05 gram of potassium persulfate. After being impregnated with the catalyzed monomeric mixture, the sample was removed from the impregnating solution, rinsed with water, then exposed for a 16 hour period to heat at a temperature of about 50° C. This caused the monomers to polymerize in situ in the polyacrylonitrile substrate thereby forming a water-insoluble copolymer additament therein which was equivalent to the copolymer products that were obtained in the foregoing examples. Following the in situ copolymerization, the copolymer-containing polyacrylonitrile fiber sample was washed thoroughly with water and dried at 150° C. Its weight, after incorporation of the copolymeric additament in the indicated manner, was found to be about 3.2 grams; corresponding to a copolymer additament content of about 6 percent, based on the weight of the resulting product. The copolymer-containing fiber product was found to have low static properties and to be quite stable to light, heat and alkalinity. Its dye-ability was very good with Sevron Brilliant Red 4G; Calcocid Alizarine Violet, an acid type of dyestuff (Colour Index 1080); Amacel Scarlet BS, an acid or acetate type of dyestuff (Colour Index 11110, also American Prototype No. 244); and Calcodur Pink 2BL. Its reflectance value upon a 4 percent dyeing in the indicated manner with the last-mentioned dyestuff was about 25. A sample of the copolymer-containing fiber product that had been dyed with Amacel Scarlet BS was subjected to ultraviolet light exposure in an Atlas Fadeometer to determine its light-fast characteristics. No discernible break in color was observed until termination of about a 20 hour period. In comparison, a similarly dyed sample of a polyacrylonitrile fiber product containing poly-N-vinylpyrrolidone as a dye-assisting adjuvant was lightfast for only about 10 hours under identical conditions of ultraviolet light exposure.

EXAMPLE "D"

The procedure of Example "C" was repeated on two 5 grams (dry weight basis) samples of the same polyacrylonitrile aquagel fiber used in the preceding examples excepting to employ different monomer impregnating solutions and to accomplish the in situ polymerization for 20 minutes at 150° C. The results that were obtained with each of the fibers are set forth in the following tabulation in which there is included a description of each of the monomeric impregnating solutions employed:

*Table 1*

IN SITU FORMATION OF COPOLYMERIC ADDITAMENTS

| Sample No. | "D-1" | "D-2" |
|---|---|---|
| Volume of Aqueous Monomer Impregnating Solution, ml | 100 | 100 |
| Quantity of N,N'-Methylenebisacrylamide in Impregnating Solution, gms | 2.0 | 1.3 |
| Quantity of Ethylene Sulfonic Acid in Impregnating Solution, gms | 2.0 | 2.7 |
| Quantity of Potassium Persulfate in Impregnating Solution, gms | 0.03 | 0.03 |
| Quantity of 50 Percent Aqueous NaOH Impregnating Solution, ml | 1.0 | 1.5 |
| pH of Impregnating Solution | 8 | 8 |
| Percent Copolymer Additament in Fiber Product on Weight of Resulting Fiber | 3.5 | 3.6 |
| Tenacity of Fiber Product, gms./denier | 2.9 | 2.9 |
| Extensibility of Fiber Product, percent | 55 | 44 |
| Yield Point of Fiber Product, gms./denier | 0.75 | 0.72 |
| Young's Modulus of Fiber Product | 30 | 28 |
| Dyeability of Fiber Product with Sevron Brilliant Red 4G | (1) | (1) |
| Static Properties of Fiber Product | (2) | (2) |

[1] Excellent.
[2] Better than Scoured Wool.

Besides the excellent properties and characteristics indicated in the foregoing, each of the copolymer-containing samples had very good stability to light, heat and alkalinity. Neither of them lost any detectable quantity of the impregnated copolymer additaments upon being subjected to severe scouring tests.

EXAMPLE "E"

The procedure of Example "C" was repeated with a 100 milliliter volume of an aqueous impregnating solution containing about 4.0 grams of ethylene sulfonic acid, 4.0 grams of N,N'-methylenebisacrylamide and 0.05 gram of potassium persulfate ($K_2S_2O_8$) excepting to conduct the in situ polymerization of the monomer-impregnated fiber for about 14 minutes at 150° C. After being washed, dried and heat set, the resulting fiber product was found to have excellent physical properties, very low static characteristics, good lightfastness and thermal stability and to be excellently dyeable with Amacel Scarlet BS, Calcodur Pink 2BL, Calcocid Alizarine Violet and Sevron Brilliant Red 4G. Its reflectance value when dyed with 4 percent Calcodur Pink 2BL was about 18.

EXAMPLE "F"

About 20.1 grams of styrene sulfonic acid, 16.8 grams of N,N'-methylenebisacrylamide, 350 milliliters of water, 0.4 gram of ammonium persulfate, and 0.3 gram of "Antarox D100" were mixed together and the pH of the resulting mixture adjusted to about 1 with an excess quantity of the acid monomer. The acidified mixture was then subjected to heat at a temperature of 58° C. with continued agitation for a 16 hour period. At the termination of the reaction period the monomeric ingredients in the reaction mass were found to have been almost completely converted to an insoluble gel that was easily dispersible in such an apparatus as a Waring Blendor. Polyacrylonitrile fibers were prepared to contain about 4.75 percent of the copolymer product using the general procedure set forth in Example "B" with a 2 percent aqueous dispersion of the copolymer additament for the aquagel as the impregnating bath. The resulting copolymer-containing fiber product had good physical properties, excellent heat, light and alkaline stability and dyed well to deep and level shades with Amacel Scarlet BS, Calcodur Pink 2BL, Calcocid Alizarine Violet and Sevron Brilliant Red 4G. The copolymer-containing fiber product showed less static susceptibility than viscose rayon yarn.

EXAMPLE "G"

About 20.1 grams of the sodium salt of styrene sulfonic acid (sodium styrene sulfonate), 16.8 grams of N,N'-methylenebisacrylamide, 350 milliliters of water and 0.4 gram of ammonium persulfate were heated together at a refluxing temperature for the mixture for a 15 minute period. The pH of the polymerization charge was about 3. The resulting conversion of the mixed monomers to a water-insoluble copolymer product was about 98.75 percent. The gel-like product was dispersed in a Waring Blendor, then used to impregnate a polyacrylonitrile aquagel fiber in the manner set forth in the preceding Example "F" with the realization of about equivalent results and properties in the copolymer-containing fiber product.

EXAMPLE "H"

About 2.2 grams of the sodium salt of 2-sulfoethyl-methacrylate, 1.5 grams of N,N'-methylenebisacrylamide, 0.04 gram of ammonium persulfate and 17 milliliters of water were heated at 50° C. for about a 16 hour period after the pH of the polymerization charge had initially been adjusted to about 3. The monomers were almost completely converted to a white, easily dispersible, water-insoluble, copolymeric gel that could be used to impregnate acrylonitrile polymer fibers in the manner of Examples "F" and "G" with results equivalent thereto in all respects.

EXAMPLE "I"

About 64.8 grams of the sodium salt of 2-sulfoethyl-methacrylate, 46.2 grams of N,N'-methylenebismethacrylamide, 0.8 gram of "Antarox D-100," 1.1 grams of ammonium persulfate, and 1350 milliliters of water were mixed together and adjusted to pH 3. The mixture was then heated at 50° C. for 16 hours with continual efficient mechanical agitation being effected. About 92.8 percent of the charged monomers were converted to a white insoluble copolymeric gel. The copolymer product was readily dispersed in an aqueous suspending vehicle (such as the reaction mass in which it was obtained) by putting it through a Fitzpatrick Homoloid Machine. The copolymer product was employed to impregnate polyacrylonitrile fibers in the manner of Examples "F" and "G." Fibers containing 5.4 percent of the copolymer had good physical properties, excellent light and heat stability, high acceptability of various dyestuffs and show less static characteristics than ordinary cotton fibers.

EXAMPLE "J"

About 20.0 grams of the sodium salt of 2-sulfoethyl-acrylate, 15.3 grams of N,N'-methylenebisacrylamide, 0.4 gram of ammonium persulfate, 0.3 gram of "Antarox D-100" and 450 milliliters of water were adjusted to pH 3 and polymerized with continued agitation for 18 hours at 50° C. Conversion of the monomers to a water-insoluble gel was 96.7 percent. Polyacrylonitrile fibers impregnated while in the aquagel form in the manner of the preceding examples so as to contain 3 percent of the copolymeric additament had satisfactory physical properties, excellent heat, light and alkaline stability and dyed well with both Calcodur Pink 2BL and Sevron Brilliant Red 4G. The copolymer-containing fibers had about the same static characteristics as cotton.

EXAMPLE "K"

About 2.0 grams of N-acryloyl taurine, sodium salt, 1.5 grams of N,N'-methylenebisacrylamide, 17.0 milliliters of water and 0.04 gram of potassium sulfate were combined to provide a polymerization mixture having a pH of about 7. The nomenclature "taurine" is commonly employed to designate 2-aminoethanesulfonic acid. The mixture was heated for 16 hours at 50° C., during which time conversion of the monomers to copolymer was essentially complete. A soft, white, water-insoluble copolymeric gel product was thereby obtained. The gel product could be easily dispersed in mechanical agitating devices. When it was impregnated in polyacrylonitrile aquagel fibers according to the foregoing procedures, fiber products were obtained having about the same desirable properties as set forth in the preceding examples.

EXAMPLE "L"

About 1.7 grams of N-allyl taurine, 1.5 grams of N,N'-methylenebisacrylamide, 17 milliliters of water and 0.03 gram of potassium persulfate were combined to provide a mixture having a pH of 4 that was heated for 16 hours at 50° C. The monomers polymerized with essentially complete conversion to a soft, white, water-insoluble gel that could be incorporated in polyacrylonitrile fibers in the above-identicated manner to provide excellent quality fibers having good inherent stability to light, heat and alkalinity, excellent dye-receptivity and low static properties.

EXAMPLE "M"

A copolymer of about equal mole proportions of sodium styrene sulfonate and N,N'-methylenebisacrylamide was prepared in the manner set forth in Example "G" and obtained with about 98.8 percent conversion of the monomeric starting materials to copolymeric product. An aqueous dispersion of about 2 percent of the water-insoluble copolymer was prepared and employed to impregnate a polyacrylonitrile aquagel fiber in a manner similar to that set forth in Example "B." The impregnation of the copolymeric additament was accomplished during the stretch-drawing of the aquagel in the last stage of the physical extension operation by means of which the fiber was being oriented and while it was immersed in a hot impregnating liquid containing the dispersed copolymer. The total stretching operation was performed in four stages. In the first stage, the aquagel was cold-stretched with a stretch ratio of 1.56:1. The initial cold stretching was followed by three hot stretch stages (the last of which being the above-mentioned stage in which the impregnation was accomplished) wherein the sequential stretches imposed were on the order of 3.89 times; 1.89 times; and 1.20 times their initial length prior to stretching, respectively. After being impregnated with the copolymer, the aquagel fiber was dried at about 150° C. It was found to contain about 2.1 percent of the copolymeric additament intimately incorporated therein.

The antistatic properties of the copolymer-containing fiber were then determined by measuring the electrical conductance of the fiber product at various humidities. As will be appreciated by those who are skilled in the art, the basis for such a test is that all fibers have a tendency to generate static electricity upon being handled. Only those that are possessed of sufficient electrical conductance to dissipate the charge as quickly as it forms are not hampered by the bothersome effects of static electricity. Thus, a measure of the electrical conductance of a fiber is a good indication of its ability to dissipate static electricity. The conductivities of the various fiber samples tested were found by determining their electrical resistances. Resistance, of course, is the reciprocal quantity of conductivity. In order to permit various fiber samples to be compared on the common basis, the conductivities of the samples tested were actually measured as volume resistivities according to the following formula:

Volume resistivity
$$= \frac{(Resistance)(Cross\text{-}sectional\ area)}{Path\ length\ between\ electrodes\ to\ which\ sample\ being\ tested\ is\ attached}$$

The units of volume resistivity are ohm-cm.$^2$/cm.

Prior to being tested, the copolymer containing polyacrylonitrile fiber prepared in the indicated manner was scoured for ½ hour at the boil using about 1.0 percent on the weight of the fiber of "Igepal CA-630" (an alkylphenoxypolyoxyethylene ethanol type of non-ionic detergent) and a 30:1 volume: fiber ratio of water. After being scoured, the fiber sample was washed thoroughly with water and dried. The actual resistivity of each sample was determined after the sample being tested was conditioned for seventy-two hours at the particular temperature and relative humidity conditions involved by tautly connecting a web-like sample of the yarn between two electrodes, each of which were 9 centimeters long spaced parallel 13 centimeters apart, and across which there was applied a 900 volt direct current potential. For purposes of comparison, the volume resistivities of cotton, wool and an unmodified polyacrylonitrile fiber (obtained in the same way as the copolymer-containing fiber but without having the copolymeric additament incorporated therein) were also tested in the indicated manner along with the copolymer-containing fiber in accordance with the present invention.

The results are set forth in the following tabulation which indicates the volume resistivities at obtained various relative humidities (R.H.) at 23° C. of each of the samples tested.

*Table 2*

VOLUME RESISTIVITIES OF VARIOUS FIBER SAMPLES COMPARED TO POLYACRYLONITRILE FIBERS IMPREGNATED WITH COPOLYMER OF SODIUM STYRENE SULFONATE AND METHYLENEBISACRYLAMIDE

| Sample | Volume Resistivity, Ohm-cm.$^2$/cm. | | | |
|---|---|---|---|---|
| | 32 Percent RH | 47 Percent RH | 58 Percent RH | 66 Percent RH |
| Sodium strene sulfonate/ methyenebisacrylamide copolymer-impregnated polyacrylonitrile fiber | 4.6×10$^{11}$ | 3.2×10$^9$ | 1.7×10$^8$ | 2.4×10$^7$ |
| Cotton | 6.4×10$^9$ | 2.7×10$^9$ | 3.0×10$^7$ | 5.4×10$^6$ |
| Wool | 5×10$^{12}$ | 2×10$^{11}$ | 1.9×10$^{10}$ | 3.3×10$^9$ |
| Unmodified polyacrylonitrile fiber | 3×10$^{14}$ | 2.7×10$^{13}$ | 5×10$^{12}$ | 1.2×10$^{12}$ |

As is apparent from the foregoing, the copolymer-containing fiber sample, even after being severely scoured, had electrical conductance properties much superior to ordinary polyacrylonitrile and only slightly poorer than cotton. At the same time, the physical properties of the copolymer-containing fiber were excellent, being about equal to those of the unmodified polyacrylonitrile fiber.

Similar excellent results were obtained in the static testing of fibers impregnated with the copolymer set forth in Examples "F" and "G."

EXAMPLE "N"

The procedure of Example "M" was repeated, excepting to impregnate the fiber with a copolymer of 2-sulfoethylacrylate and N,N'-methylenebisacrylamide obtained from about equal mole proportions of the monomers that were converted about 96.7 percent to copolymeric product. The volume resistivities under various conditions of relative humidity at 23° C. of the copolymer-containing fiber product were determined in the manner set forth in Example "M." The values found were 1.5×10$^{12}$ ohm-cm.$^2$/cm. at 32 percent R.H.; 5.7×10$^{10}$ ohm-cm.$^2$/cm. at 47 percent R.H.; 3.9×10$^9$ ohm-cm.$^2$/cm. at 58 percent R.H.; and 7.5×10$^8$ ohm-cm.$^2$/cm. at 66 percent R.H. The superiority in antistatic properties of the copolymer-containing fiber is evidenced by comparison of the foregoing volume resistivity values with those obtained under the same conditions for cotton, wool and unmodified polyacrylonitrile fibers as set forth in the preceding Table 2.

About the same results were obtained with the polyacrylonitrile fiber samples impregnated with the copolymer described in Example "J."

EXAMPLE "O"

A copolymer of the 2-sulfoethylmethacrylate and N,N'-methylenebisacrylamide obtained from a charge of about equal mole proportions of the monomers that had been converted to copolymeric product in the amount of about 93 percent was impregnated in a polyacrylonitrile fiber according to the manner set forth in Example "M," excepting that the resulting fiber product contained only about 1.9 percent by weight of the copolymeric additament. The volume resistivity of the scoured fiber sample at 32 percent R.H. and 23° C., was about 1×10$^{12}$ ohm-cm.$^2$/cm.; at the same temperature under 47 percent R.H. it was about 1.7×10$^9$ ohm-cm.$^2$/cm.; at the same temperature under 58 percent R.H. it was about 8.2×10$^7$ ohm-cm.$^2$/cm.; and at 66 percent R.H. (same temperature) it was about 1.7×10$^7$. This data indicates the superiority of the copolymer-containing fiber over unmodified polyacrylonitrile fiber and wool and the similarity in its antistatic characteristics with those of cotton.

Similar results were obtained in antistatic tests conducted on polyacrylonitrile fibers impregnated with each of the copolymers that are described in Examples "H" and "I."

Results similar to those set forth in the foregoing can also be obtained when the copolymeric additaments are incorporated in polyacrylonitrile and other acrylonitrile fibers to provide articles in accordance with the present invention by blending the copolymeric additament and the fiber-forming acrylonitrile polymer in a spinning composition or dope prior to its extrusion into filamentary products by either wet spinning or dry spinning techniques. In such instances, incidentally, it may be desirable in order to secure optimum benefit in the practice of the invention to employ relatively larger quantities of the copolymeric additament than when surface impregnation is performed so that the presence of effective quantities of the additament at or near the surface of the article is assured.

The water-insoluble copolymeric additaments that are employed in the practice of the invention, as is indicated in the foregoing, are cross-linked copolymeric products of (1) alkylene or alkylidene acrylamide or methacrylamide or methacrylamide monomers having the formula:

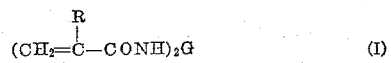

wherein G is selected from the group of bivalent radicals consisting of methylene, ethylene, ortho-phenylene, para-phenylene, and 1,1-alkylidene units that contain from 2 to about 5 carbon atoms and wherein R is hydrogen or a methyl group and (2) vinyl and other alkenyl group-containing organic sulfonic acids and derivatives thereof that are selected from the group of such compounds consisting of those represented by the formulae (including mixtures thereof):

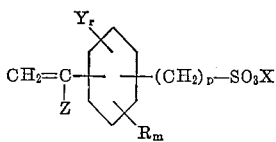
(aromatic organic sulfonic acid compounds)

$$CH_2=CH-(CH_2)_m-SO_3X; \quad (III)$$
(alkenyl organic sulfonic acid compounds)

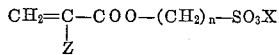
(sulfoalkylacrylate organic sulfonic acid compounds)

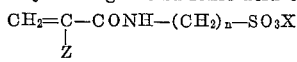
(acryloyl taurine homolog compounds)

and

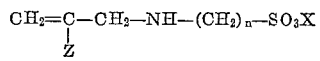
(allyl taurine homolog compounds)

all wherein X is hydrogen, an aliphatic hydrocarbon radical containing from 1 to 4 carbon atoms or an alkali metal ion; Y is hydrogen, chlorine or bromine; R is methyl or ethyl; Z is hydrogen or methyl; $m$ has a numerical value in whole number increments from 0 to 2; $n$ has a numerical value of 1 or 2; $p$ is 0 or 1; and $r$ is 1 to 4. Besides those specifically illustrated, other organic sulfonic acids may also be utilized for the preparation of the water-insoluble copolymers of the present invention such, by way of illustration, as those which are set forth in the disclosure of United States Letters Patent Number 2,527,300. Various species of suitable organic sulfonic acid monomers are set forth in the Appendix attached hereto.

The alkylidenebisacrylamide monomers may be prepared from aldehydes and acrylonitrile according to the following illustrative equation:

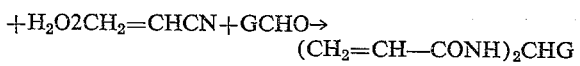

whereas the alkylenebisacrylamides are available from the reaction between diamines and acrylic acid according to the following illustrative equation:

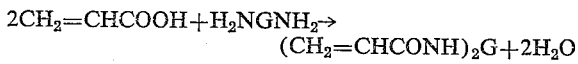

Typical of the acrylamide monomers that may be utilized for preparation of the copolymers used in the practice of the present invention are the following, grouped according to the general type of linkage connecting the acrylate or methacrylate units of the compound:

ALKYLENE LINKED MONOMERS

Methylene-N,N'-bisacrylamide
Methylene-N,N'-bismethacrylamide
Ethylene-N,N'-bisacrylamide
Ethylene-N,N'-bismethacrylamide

PHENYLENE LINKED MONOMERS

Ortho-phenylene-N,N'-bisacrylamide
Ortho-phenylene-N,N'-bismethacrylamide
Para-phenylene-N,N'-bisacrylamide
Para-phenylene-N,N'-bismethacrylamide

ALKYLIDENE LINKED MONOMERS

Ethylidene-N,N'-bisacrylamide
Ethylidene-N,N'-bismethacrylamide
Propylidene-N,N'-bisacrylamide
Butylidene-N,N'-bisacrylamide
Isobutylidene-N,N'-bismethacrylamide
Pentylidene-N,N'-bisacrylamide In addition to the copolymers specifically described in the foregoing examples, other water-insoluble copolymeric additaments that may advantageously be employed in the practice of the present invention include copolymers of methylenebisacrylamide or methylenebismethacrylamide with such organic sulfonic acids as 2-propene sulfonic acid; sodium para-vinylbenzene sulfonate; X-sulfopropyl acrylate ("X" indicating that the sulfo group may be on any of the carbon atoms of the propyl group); 2-sulfoacrylic acid, sodium vinyl toluene sulfonate; potassium ortho-chlorostyrene sulfonate; 2-hydroxy-3-sulfopropyl acrylate, sodium salt; sodium 3-allyloxy-2-hydroxypropane sulfonate; 4-sulfophenyl acrylate, sodium salt; N-allyl imino di-(2-ethane sulfonic acid); and the like, including copolymers with other of the alkylene, alkylidene and phenylene linked acrylamide and methacrylamide monomers mentioned in the foregoing.

The copolymeric additaments that are employed in the practice of the invention may generally be prepared by conventional methods of polymerization, including those which have been demonstrated in the foregoing illustrative examples. In addition to the usual catalysts, including persulfates, organic and inorganic peroxides and azo type catalysts, the copolymers may oftentimes be polymerized under the influence of high energy radiation such as by means of X-rays and the like, or simply by heating and evaporating the monomer-containing polymerization mixture. The copolymers may be prepared in both aqueous and organic solvent vehicles, using temperatures for the desired polymerization that may vary from about room temperature to the boiling point of the polymerization mixture. It is ordinarily satisfactory to conduct the reaction at a temperature of about 50 to 80 or 100° C. Usually, depending upon the specific factors that may be involved, the copolymerization may be accomplished satisfactorily within a time period of about 10 to 60 hours.

The compositions of the copolymeric additament can vary within rather wide limits. The content of either monomeric constituent may advantageously be between about 20 and 80 mole percent. In many cases, especially to secure optimum dye-receptivity, nearly equivalent or about commensurate or equal molar proportions of each monomeric constituent may be employed with great benefit in the preparation of the copolymeric additaments.

The polymerization system that is employed for the preparation of the copolymers used in the present invention may consist of as much as 50 percent by weight of the monomers to be polymerized in the aqueous or other medium. The amount of monomeric material that is provided in the copolymerization system may be influenced somewhat by the manner in which it is intended to incorporate the product in the synthetic polymer compositions in order to provide the compositions of the invention.

If, for example, it is intended to incorporate the copolymer products by blending into a fiber-forming composition prior to its fabrication into shaped articles, the copolymerization system may, if desired, contain about equal proportions by weight of the charged monomeric materials and the polymerization medium which preferably is miscible with and tolerable in the spinning solution solvent being used. In such cases, the copolymer product may ordinarily be obtained as an easily dispersed gel that, after being dried and isolated from unreacted monomer, may readily be directly incorporated in the fiber-forming composition.

If the incorporation of the copolymeric additament in a fiber-forming composition is to be achieved by impregnation therewith of an already-formed shaped article of the composition, it may be desirable to effect the polymerization so as to directly form the polymerization system as a suitable applicating emulsion or suspension of the copolymeric product. For such purposes, the polymerization system may be prepared to contain as little as 5 or 10 percent by weight of the polymerizing monomeric ingredients. Preferably, such a polymerization may be conducted under the influence of vigorous agitation to facilitate preparation of an emulsified or thoroughly dispersed product. It may also be beneficial under such circumstances to incorporate a dispersant or emulsifying agent in the polymerization system to facilitate obtaining a stable and homogeneous emulsified product. Such a method for preparing the copolymeric additaments that are employed in the present invention may be especially appropriate when they are intended to be applied to acrylonitrile polymer fibers and the like that are derived from aquagels in the course of their manufacture, such as the acrylonitrile polymer fibers that are wet spun from aqueous saline solutions of the fiber-forming polymer.

In such instances, as has been demonstrated, the emulsified, water-insoluble, copolymeric additaments may be impregnated into the fiber while it is in a swollen or gel condition, as an acrylonitrile polymer fiber in an aquagel condition, in order to obtain the desired copolymer-containing product.

In this connection, when it is desired to blend the copolymeric additament in a synthetic polymer fiber-forming solution prior to its extrusion, such as an aqueous saline acrylonitrile polymer solution, the water-insoluble copolymer may be physically reduced by comminution to a sufficiently fine state to permit its dispersion in spinnable condition throughout the blended spinning solution in the event that it is otherwise insoluble in the solvent. While this may be accomplished by diverse techniques, it is generally advantageous to comminute the copolymer in the presence of the non-dissolving solvent, such as an aqueous saline polyacrylonitrile solvent, to form a stable suspension that may be more conveniently blended with the spinning solution of the synthetic polymer, such as an aqueous saline acrylonitrile polymer spinning solution. Thus, if the aqueous saline polyacrylonitrile solvent that is being employed is an aqueous solution of zinc chloride or its equivalent that contains at least about 55 percent and preferably about 60 percent by weight of dissolved zinc chloride, it may be advantageous to comminute the copolymeric additament while it is in a mixture with the saline solvent solution that contains between about 5 and 10 percent by weight of the copolymer. Analogous procedures may be employed when other solvents are involved. Ball or rod mills or other attrition apparatus may be employed beneficially for the comminution. It is generally beneficial under such circumstances to avoid the use of balls or rods that are made of metal since they may contaminate the product, especially when aqueous saline solvents are utilized. Procelain or other ceramic parts may usually be employed with advantage. A stable suspension of the copolymeric additament in the acrylonitrile polymer solvent that is suitable for blending in the spinning solution of the acrylonitrile polymer to provide a spinnable composition may usually be obtained by milling the mixture of copolymeric additament and solvent for an extended period that may exceed 100 hours. The suspension that is thereby obtained may then be directly blended in the proper proportions with the acrylonitrile polymer spinning solution to provide a composition in accordance with the present invention.

If desired, the copolymer-containing acrylonitrile polymer compositions may comprise as much as 15 to 20 or more percent by weight of the copolymeric additament, based on the weight of the composition. Usually, however, suitable properties and characteristics and better fiber-forming properties in a given composition may be achieved when lesser proportions of the copolymeric additament are incorporated therein. An appreciable improvement in dye-receptivity, anti-static properties and stability may frequently be obtained when a quantity of the copolymeric additament that is less than 1 percent by weight is employed. Advantageously, an amount between about 0.5 and 15 percent by weight of the copolymeric additament may thus be utilized in the composition. Greater advantages may often accrue when the amount of the copolymeric additament that is incorporated in the composition is in the neighborhood of 2–5 percent by weight, based on the weight of the composition.

As has been indicated, the copolymeric additaments may be incorporated in the acrylonitrile polymer compositions according to various techniques. Thus, for example, the copolymeric additament and the acrylonitrile polymer may be directly blended in order to provide the composition which, incidentally, may be used for any desired fabrication purpose in addition to fiber-forming and the like. Beneficially, the polymers may be comminuted, either separately or in combination, before being intimately blended together by mechanical or other means. The blended polymers may be prepared into suitable fiber-forming systems by dispersing them in a suitable liquid medium. Or, the compositions may be provided in fiber-forming system by sequentially dispersing the polymers in any desired order in a suitable medium, as by incorporating the copolymeric additament in a prepared acrylonitrile polymer spinning solution, dope or the like. As is obvious, the cross-linked copolymeric additaments employed in the practice of the present invention are generally insoluble, despite the fact that they are readily dispersible in most solvents.

As is evident from the illustrative examples heretofore included, a highly advantageous technique for providing the compositions, particularly when acrylonitrile polymer fiber products are involved, is to apply or impregnate the copolymeric additament from an aqueous dispersion thereof to a shaped acrylonitrile polymer article that is in an aquagel condition in a manner similar and analogous to that employed for the impregnation of vinyl lactam polymers as described in the disclosure contained in the copending application of George W. Stanton, Theodore B. Lefferdink, Richard W. Meikle and Mary J. Charlesworth for a "Method and Composition for Rendering Polyacrylonitrile Readily Dyeable" having Serial No. 333,385 which was filed on January 26, 1953. Thus, an acrylonitrile polymer filamentary article that has been spun from an aqueous saline spinning solution may be conveniently passed, after its coagulation and while it is in an aquagel condition, through a water bath containing a dispersed copolymeric additament in order to impregnate the filament with the copolymer and provide a composition and an article in accordance with the invention. In addition, as has been demonstrated in the examples, in situ polymerization techniques may also be relied upon to provide the copolymeric additament in the acrylonitrile polymers in either fabricated or unfabricated form.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbons, tapes, films, foils, sheets and the like which may be manufactured from synthetic polymeric materials. It is frequently desirable to employ concentrated solutions of salts or mixtures of salts as the dispersing or dissolving media for such purposes. Such solutions may, as has been indicated, contain at least about 55 percent by weight, based on the weight of the solution, of zinc chloride or other known saline solvents for the polymer. Acrylonitrile polymer fiber products that are spun from saline fiber-forming systems may, by way of further illustration, be coagulated in more dilute saline solutions of a like or similar nature and may then be processed after coagulation according to conventional techniques of washing, stretching, drying, finishing and the like with the modification of the present invention being accomplished prior or subsequent to the spinning as may be desired and suitable in particular instances.

The acrylonitrile polymer fiber products in accordance with the present invention (one of which is schematically illustrated in the sole figure of the accompanying drawing) have excellent physical properties and other desirable characteristics for a textile material and have a high capacity for and are readily and satisfactorily dyeable to deep and level shades with any of a wide variety of dyestuffs. For example, they may be easily and successfully dyed according to conventional procedures using acid, vat, acetate, direct, naphthol and sulfur dyes. Such dyestuffs, by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index Direct Red 1—also known as Amacel Scarlet BS, and having American prototype Number 244), Calcodur Pink 2BL (Colour Index 353, also more recently Colour Index Direct Red 75), Naphthol ASMX (Colour Index 35527), Fast Red TRN Salt (Colour Index Azoic Diazo Component 11), and Immedial Bordeaux X (Colour Index Sulphur Brown 12), may advantageously be employed for such purposes.

Other dyestuffs, by way of further illustration, that may be utilized beneficially on the acrylic fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151), and Erie Fast Scarlet 4BA (Colour Index Direct Red 24); such acid dyes as Anthraquinone Green GN (Colour Index Acid Green 25), Sulfonine Brown 2R Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1); and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. Paste (Colour Index Vat Blue 5), and Sulfanthrene Red 3B Paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Con. (Both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

*Appendix*

Representative of the various monomeric organic sulfonic acid compounds that may be employed satisfactorily in the practice of the invention are those set forth in the following listing, wherein they are grouped according to the several designated types. The list, by no means exhaustive, includes species not mentioned in the foregoing.

AROMATIC ALKENYL GROUP-CONTAINING SULFONIC ACID COMPOUNDS (FORMULA II)

Para-styrene sulfonic acid
Ortho-styrene sulfonic acid
Para-isopropylene benzene sulfonic acid
Para-vinyl benfiyl sulfonic acid
Ortho-isopropenyl benzyl sulfonic acid
Sodium para-styrene sulfonate
Potassium ortho-styrene sulfonate
Methyl para-styrene sulfonate
Ethyl para-vinyl benzyl sulfonate
Ortho vinyl benzene sulfonic acid
Isopropyl ortho-isopropenyl benzene sulfonate
n-Butyl ortho-styrene sulfonate
Tertiary butyl para-styrene sulfonate
2-chloro-4-vinyl benzene sulfonic acid
4-bromo-2-isopropenyl benzene sulfonic acid
3-vinyl toluene 6-sulfonic acid, sodium salt
2-ethyl-4-vinyl benzene sulfonic acid
2,3-dichloro-4-vinyl benzene sulfonic acid
2,3,5-tribromo-4-vinyl benzene sulfonic acid
2-chloro-3-vinyl-toluene-6-sulfonic acid
2,3-diethyl-4-vinyl-benzyl sulfonate, sodium salt The dyed products are generally lightfast and stable to heat and are well imbued with a resistance to crocking. In addition, the dyed products exhibit good washfastness and retain the dye-assisting copolymeric additament in a substantially permanent manner despite repeated exposure and subjection to washing, laundering and dry cleaning treatments.

ALKENYL SULFONIC ACID COMPOUNDS (FORMULA III)

Ethylene sulfonic acid
Sodium ethylene sulfonate
Potassium ethylene sulfonate
Methyl ethylene sulfonate
Isopropyl ethylene sulfonate
1-propene 3-sulfonic acid
1-propene 1-sulfonic acid, sodium salt
1-propene 2-sulfonic acid, ethyl ester
1-butylene 4-sulfonic acid, n-butyl ester
1-butylene 3-sulfonic acid
Tertiary butylene sulfonic acid

SULFOALKYLACRYLATE COMPOUNDS (FORMULA IV)

Sulfomethylacrylate
2-sulfoethylacrylate
Sulfomethylmethacrylate, sodium salt
2-sulfoethylmethacrylate, methyl ester
2-sulfoethylmethacrylate, potassium salt

ACRYLOYL TAURINE AND HOMOLOGOUS COMPOUNDS (FORMULA V)

N-acryloyl taurine
N-acryloyl taurine, sodium salt
N-methacryloyl taurine, methyl ester
N-methcryloyl taurine, potassium salt
N-acryloyl taurine, ethyl ester
N-acryloyl-aminomethane sulfonic acid
N-methacryloyl-aminomethane sulfonic acid, sodium salt
Methyl N-methacrylol-aminomethane sulfonate

ALLYL TAURINE AND HOMOLOGOUS COMPOUNDS (FORMULA VI)

Allyl tuarine
Allyl taurine, sodium salt
Allyl taurine, potassium salt
Methallyl taurine
Methallyl taurine, methyl ester
Methallyl taurine, isopropyl ester
N-allyl-aminomethane sulfonic acid
Sodium N-ally-aminomethane sulfonate
Lithium N-methallyl-aminomethane sulfonate
n-Butyl N-allyl-aminomethane sulfonate

What is claimed is:

1. Composition comprising a major proportion of at least about 80 weight percent, based on composition weight, of (1) a fiber forming polymer that is a polymer of an ethylenically unsaturated monomeric material containing at least about 80 weight percent of acrylonitrile and (2) a minor proportion of up to about 20 percent by weight, based on the weight of the composition, of a copolymer of (a) from about 20 to 80 mole percent of an alkylenebisacrylamide of the formula:

wherein R is selected from the group consisting of hydrogen and methyl and G is a bivalent radical selected from the group consisting of methylene, ethylene, ortho-phenylene, para-phenylene and 1,1-alkylidene radicals that contain from 2 to 5 carbon atoms, and (b) from about 80 to 20 mole percent of a alkenyl group-containing organic sulfonic acid compound selected from at least one member of the group consisting of those represented by the formulae:

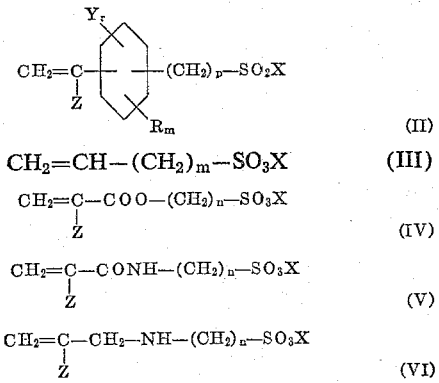

where X is selected from the group consisting of hydrogen, aliphatic, paraffinic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, $m$ is an integer from 0 to 2; $n$ is an integer from 1 to 2; $p$ is an integer from 0 to 1; and $r$ is an integer from 1 to 4.

2. The composition of claim 1 containing a minor proportion of between 0.5 and 15 percent by weight, based on the weight of the composition, of said copolymer.

3. The composition of claim 1 containing a minor proportion of between about 2 and 5 percent by weight, based on the weight of the composition of said copolymer.

4. The composition of claim 1, wherein the copolymer is comprised of about equal molar proportions of each of said alkylenebis-acrylamide and said organic sulfonic acid compound monomeric constituents.

5. The composition of claim 1, wherein the copolymer is a copolymer of a styrene sulfonate of the above-identified Formula (II) and N,N'-methylenebisacrylamide.

6. The composition of claim 1, wherein the copolymer is a copolymer of 2-sulfoethylacrylate and N,N'-methylenebisacrylamide.

7. The composition of claim 1, wherein the copolymer is a copolymer of 2-sulfoethylmethacrylate and N,N'-methylenebisacrylamide.

8. The composition of claim 1, wherein the copolymer is a copolymer of ethylene sulfonic acid and N,N'-methylenebisacrylamide.

9. The composition of claim 1, wherein the copolymer is a copolymer of N-acryloyl taurine and N,N'-methylenebisacrylamide.

10. The composition of claim 1, wherein the acrylonitrile polymer is polyacrylonitrile.

11. The composition of claim 1 dispersed in a solvent for polyacrylonitrile.

12. A filamentary shaped article fabricated from and comprising a composition that is set forth in claim 1.

References Cited in the file of this patent
UNITED STATES PATENTS

| | | |
|---|---|---|
| 2,417,312 | MacGregor | Mar. 11, 1947 |
| 2,418,696 | Cameron et al. | Apr. 8, 1947 |
| 2,527,300 | Dudley | Oct. 24, 1950 |
| 2,614,289 | Cresswell et al. | Oct 21, 1952 |
| 2,776,271 | Coover et al. | Jan. 1, 1957 |
| 2,786,043 | Schuller et al. | Mar. 19, 1957 |
| 2,861,101 | Tousignant et al. | Nov. 18, 1958 |